United States Patent
Roney, III

(10) Patent No.: US 9,301,506 B2
(45) Date of Patent: Apr. 5, 2016

(54) NON-CHOKING DOG HARNESS

(71) Applicant: William T. Roney, III, Gardnerville, NV (US)

(72) Inventor: William T. Roney, III, Gardnerville, NV (US)

( * ) Notice: Subject to any disclaimer, the term of this patent is extended or adjusted under 35 U.S.C. 154(b) by 49 days.

(21) Appl. No.: 14/250,499

(22) Filed: Apr. 11, 2014

(65) Prior Publication Data

US 2014/0311423 A1 Oct. 23, 2014

Related U.S. Application Data

(60) Provisional application No. 61/814,593, filed on Apr. 22, 2013.

(51) Int. Cl.
*A01K 27/00* (2006.01)

(52) U.S. Cl.
CPC .................... *A01K 27/002* (2013.01)

(58) Field of Classification Search
CPC . A01K 27/001; A01K 27/002; A01K 27/003; A01K 13/006; A01K 13/008
See application file for complete search history.

(56) References Cited

U.S. PATENT DOCUMENTS

| | | | |
|---|---|---|---|
| 3,769,939 A | 11/1973 | Wais et al. | |
| 4,964,369 A | 10/1990 | Sporn | |
| 5,325,819 A | 7/1994 | Krauss | |
| 5,329,885 A * | 7/1994 | Sporn | 119/864 |
| 5,335,627 A | 8/1994 | Bandimere | |
| 5,383,426 A | 1/1995 | Krauss | |
| 5,456,213 A | 10/1995 | Beauchamp | |
| 5,471,953 A | 12/1995 | Sporn | |
| 5,511,515 A | 4/1996 | Brown et al. | |
| 5,682,840 A | 11/1997 | McFarland | |
| 5,713,308 A | 2/1998 | Holt, Jr. | |
| 6,101,979 A * | 8/2000 | Wilson et al. | 119/725 |
| 6,792,894 B1 | 9/2004 | Donaldson | |
| 7,757,641 B1 * | 7/2010 | Worden | 119/856 |
| 2010/0263602 A1 * | 10/2010 | Cho | 119/792 |
| 2012/0298051 A1 | 11/2012 | Cho | |

FOREIGN PATENT DOCUMENTS

WO WO 9829281 A1 * 7/1998 ............. B60R 22/10

* cited by examiner

*Primary Examiner* — Brian M O'Hara
*Assistant Examiner* — Aaron Rodziwicz
(74) *Attorney, Agent, or Firm* — Buckingham, Doolittle & Burroughs, LLC

(57) ABSTRACT

A pet harness device is disclosed that enables users to control animals without placing unnecessary pressure or stress on the animal's trachea, neck, and/or leg pits. The pet harness device comprises an X-shaped component secured around an animal's front legs and chest and then secured on top of an animal's back via a cord component. The X-shaped component comprises a first pair of extending portions that are positioned around an animal's front legs and a second pair of extending portions that are positioned around an animal's chest. The extending portions are then secured on top of the animal's back via a cord component. The cord component comprises a plurality of adjustable buckles for securing the X-shaped component together on top of the animal's back, and at least one ring for securing a leash strap component. A leash can then be secured to the leash strap component for controlling the animal.

12 Claims, 5 Drawing Sheets

NON-CHOKING DOG HARNESS

CROSS-REFERENCE

This application claims priority from Provisional Patent Application Ser. No. 61/814,593 filed Apr. 22, 2013.

BACKGROUND

There are various collars and harnesses available to assist users when walking pets. Unfortunately, when animals pull away on a leash, these collars and harnesses place undue pressure and stress around an animal's trachea, neck, and front leg pits. This pressure can lead to serious injuries and possibly even strangulation. An effective solution is necessary.

The present invention restrains a pet without placing pressure on its neck or trachea, and relieves pressure on the animal's front leg pits. The pet harness device also eliminates the potential for serious injuries and strangulation, and provides greater control over an animal when walking outside. The pet harness device benefits pet owners, groomers, and professional dog walkers.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a pet harness device that enables users to control animals without placing unnecessary pressure or stress on the animal's trachea, neck, and/or leg pits. The pet harness device comprises an X-shaped component with both front and rear extending portions. The front extending portion secures on an animal's front bilateral scapula/humorous (legs) and the rear extending portion secures around the chest/stomach and then both are secured on top of an animal's back via an I-shaped cord component. The pet harness device can be utilized with almost any pet regardless of shape or size. Specifically, the X-shaped component comprises a first pair of extending portions with an adjustable clip, an adjustable buckle and a loose ring that secure around an animal's chest/stomach and a second pair of extending portions with two adjustable buckles that secure on an animal's bilateral scapula/humorous (legs).

The first and second extending portions being secured on top of the animal's back via an I-shaped cord component that serves as the controlling/functioning portion of the harness. The I-shaped cord component comprises two rings and at least one adjustable buckle. Specifically, the cord component is comprised of a strap and the first ring of the cord component secures the second pair of extending portions together on top of the animal's back. Additionally, the second ring of the cord component allows passage of the first pair of extending portions and the leash strap component.

In a preferred embodiment, a leash can be secured to the leash strap component for controlling the animal. Specifically, the leash strap component can comprise a leash ring for engaging and retaining the leash. The leash is then secured to the leash ring, wherein pulling on the leash results in light pressure being exerted by the pet harness device to the chest or ribcage of the animal, forcing the animal to retract.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

Figure 1:
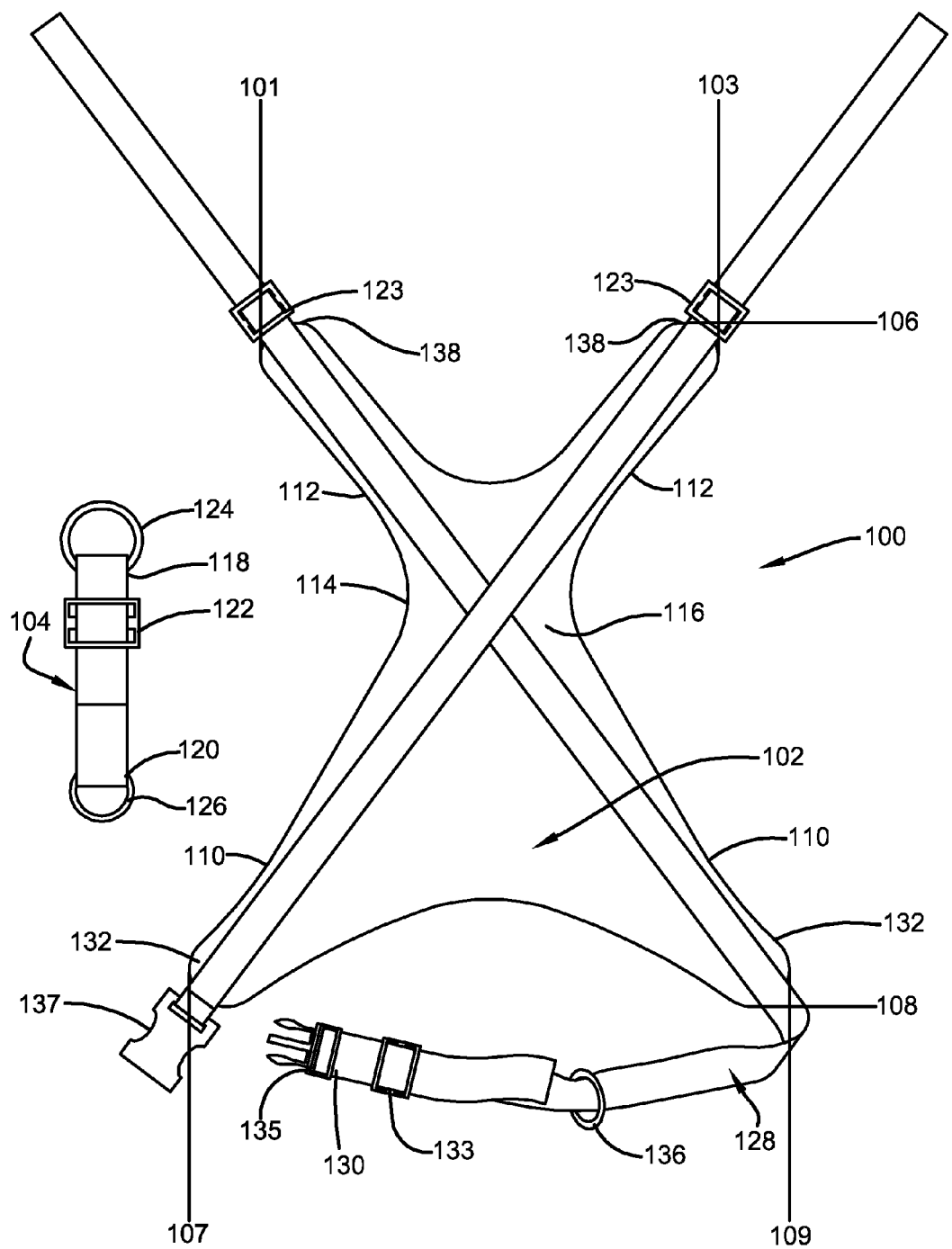
FIG. 1 illustrates a top, plan view of the pet harness device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention restrains a pet without placing pressure on the animal's neck or trachea, and relieves pressure on the animal's front leg pits. The pet harness device also eliminates the potential for serious injuries and strangulation, and provides greater control over an animal when walking outside. The pet harness device benefits pet owners, groomers, and professional dog walkers.

The pet harness device comprises an X-shaped component secured around an animal's front legs and chest and then secured on top of an animal's back via a cord component. The X-shaped component comprises a second pair of extending portions that secure around an animal's front legs and a first pair of extending portions that secure around an animal's chest. The extending portions are then secured on top of the animal's back via an I-shaped cord component. The I-shaped cord component comprises two rings and at least one adjustable buckle for securing the X-shaped component together on top of the animal's back. A leash strap component is then secured to the first pair of extending portions of the X-shaped component. A leash can then be secured to the leash strap component for controlling the animal.

Figure 2:
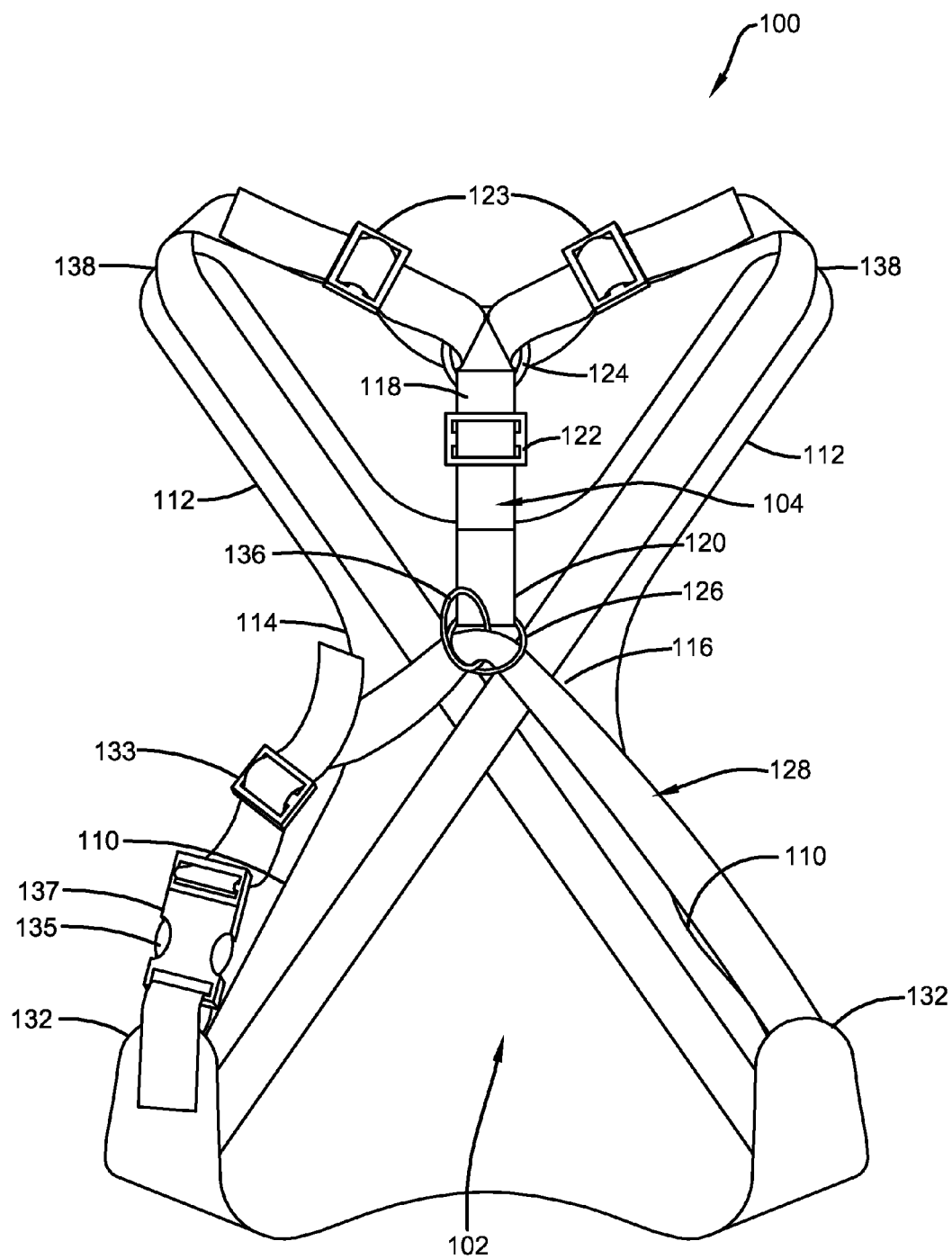
FIG. 2 illustrates a perspective view of the pet harness device secured together in accordance with the disclosed architecture.

Referring initially to the drawings, FIGS. 1-4 illustrate the pet harness device 100 that enables users to control animals without placing unnecessary pressure or stress on the animal's trachea, neck, and/or leg pits. The pet harness device 100 comprises an X-shaped component 102 secured around an animal's front legs and chest and then secured on top of an animal's back via an I-shaped cord component 104 (as shown in FIG. 1-2).

The pet harness device 100 can be utilized with almost any pet regardless of shape or size. The X-shaped component 102 comprises a top end 106, a bottom end 108, a first pair of extending portions 110, a second pair of extending portions 112, a front surface 114, and a back surface 116. Typically, the X-shaped component 102 is custom-shaped as an 'X', but can be any suitable shape as is known in the art. The X-shaped component 102 would generally be constructed of a stretchable mesh material, though any other suitable material may be used to manufacture the X-shaped component 102 as is known in the art without affecting the overall concept of the invention.

The X-shaped component 102 can also comprise a variety of colors and designs to suit user and manufacturing preference. While the shape and size of the X-shaped component 102 may vary greatly depending on the wants and needs of a user, and depending on the size of the pet, the X-shaped component 102 is approximately between 6 and 25 inches in height as measured from a top end 106 to a bottom end 108, and approximately between 6 and 14 inches wide for the second pair of extending portions as measured from end 101 to end 103, and approximately between 8 and 18 inches wide for the first pair of extending portions as measured from end 107 to end 109 and approximately between 1/16 and 3/8 inches thick as measured from a front surface 114 to a back surface 116.

Figure 4:
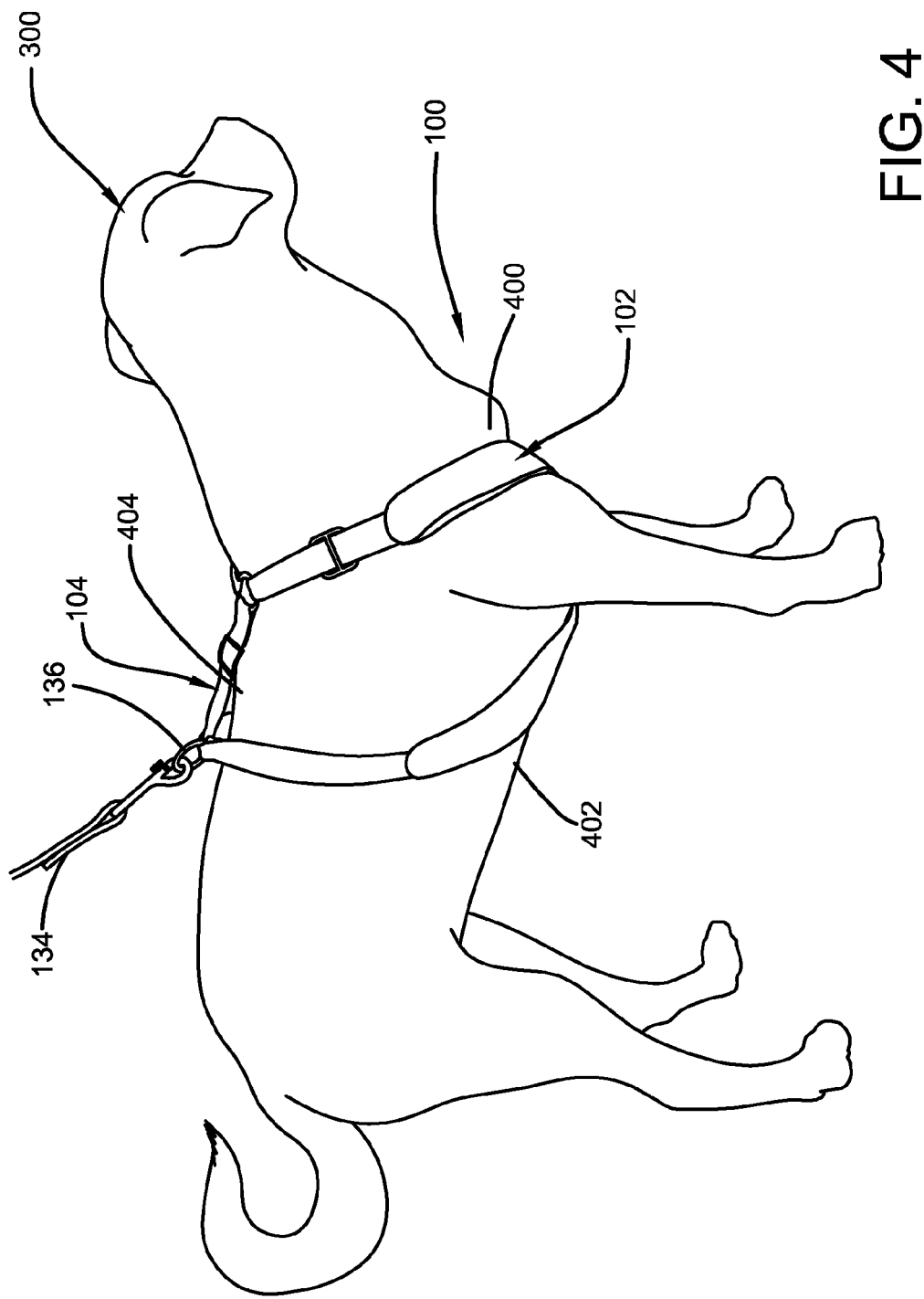
FIG. 4 illustrates a side, perspective view of the pet harness device secured to a dog in accordance with the disclosed architecture.

The X-shaped component 102 comprises a first pair of extending portions 110 and a second pair of extending portions 112 that secure around an animal's front legs 400 and chest 402. Specifically, the X-shaped component 102 is configured such that the second pair of extending portions 112 are positioned on either side of the animal's front legs 400, and the first pair of extending portions 110 are positioned on either side of the animal's chest 402. The first and second pairs of extending portions 110 and 112 are then secured on top of the animal's back 404 via a cord component 104 (as shown in FIG. 4). The second pair of extending portions 112 can also comprise adjustable buckles or clips 123 that allows the X-shaped component 102 to be adjusted and securely attached to the animal.

Figure 3:
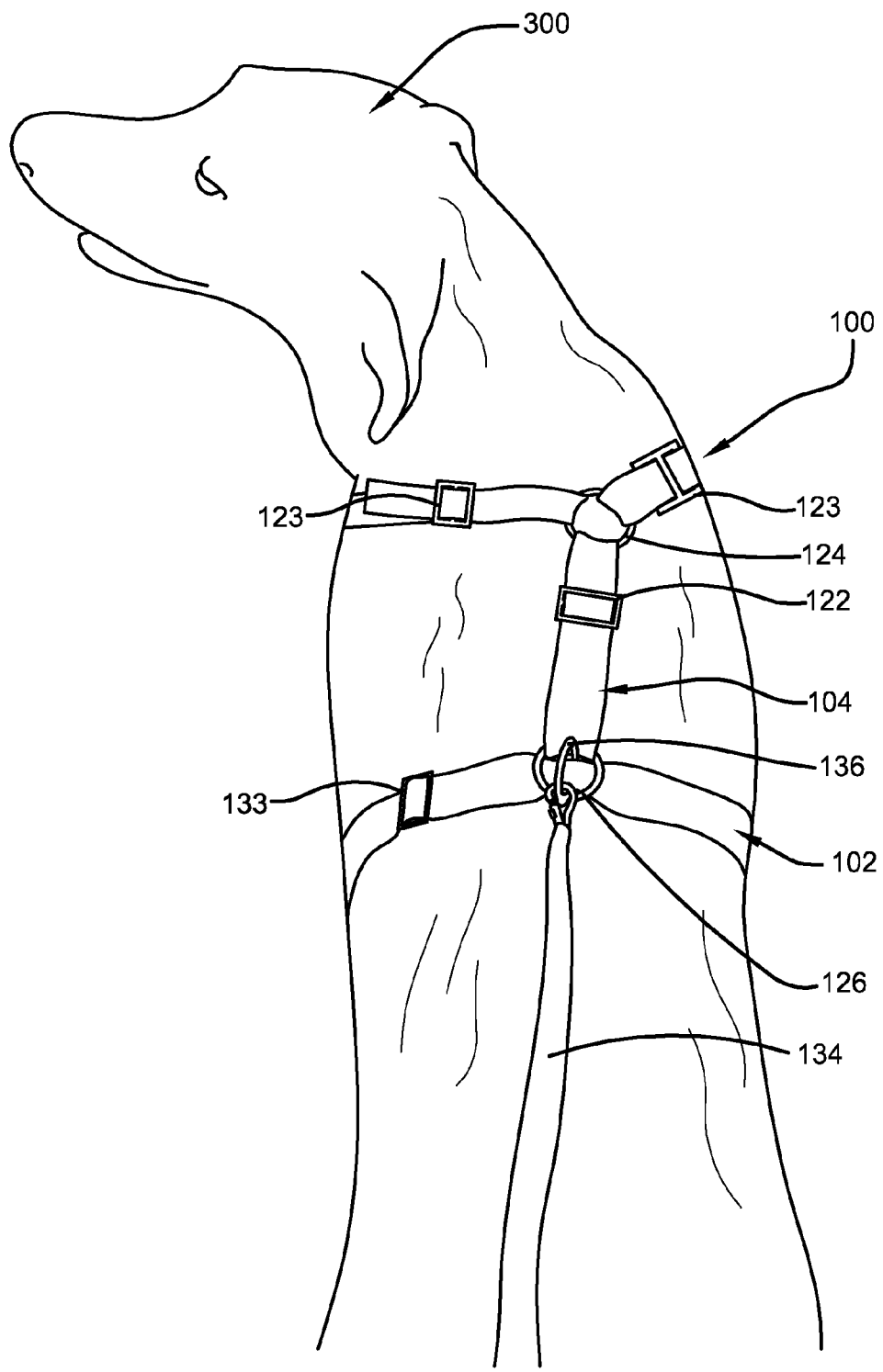
FIG. 3 illustrates a back, perspective view of the pet harness device secured to a dog in accordance with the disclosed architecture.

The cord component 104 is typically I-shaped and made of nylon or any other suitable material as is known in the art, and comprises a first end 118 and a second end 120. The cord component 104 also comprises at least one adjustable buckle 122, and rings 124 and 126 for securing the cord component 104 to the X-shaped component 102. Specifically, one adjustable buckle 122 can be secured to the first end 118 of the cord component 104. However, any suitable number of adjustable buckles 122 can be secured as is known in the art, as long as the adjustable buckles 122 allow the cord component 104 to secure the X-shaped component 102 together on top of the animal's back 404. Further, the adjustable buckle 122 can also be any other suitable securing mechanism that allows a user to adjust the cord component 104 such that the X-shaped component 102 will fit snugly against any size animal (as shown in FIG. 3).

The first ring 124 of the cord component 104 is used to secure the second pair of extending portions 112 together. Specifically, the ends 138 of the second pair of extending portions 112 are threaded through the first ring 124 and secured via adjustable buckles 123. Additionally, the cord component 104 comprises a second ring 126 secured to the second end 120. Specifically, the second ring 126 is secured to the second end 120 via any suitable securing means as is known in the art, such as sewing, gluing, etc.

The second ring 126 acts as a ring guide that allows the leash strap component 128 and ring 136 to be passed through (or secured through) the second ring 126. The leash strap component 128 can be threaded through the second ring 126 and through ring 136. Further, the ends 130 of the leash strap component 128 comprise hook and loop fasteners or other suitable securing means to secure to the ends 132 of the first pair of extending portions 110 of the X-shaped component 102. The ends 132 of the first pair of extending portions 110 would also comprise a hook and loop fastener or other suitable securing means to secure the ends 130 of the leash strap component 128 to the ends 132 of the first pair of extending portions 110. Typically, one end of the leash strap component 128 is integral with the end 132 of the first pair of extending portions 110, and the other end of the leash strap component 128 is secured to the opposite end 132 via a buckle 135 that mates with a buckle 137 on the end 132 (as shown in FIG. 1).

Further, the leash strap component 128 can comprise an adjustable buckle 133 for adjusting the least strap component 128, to make sure it is secure around the animal 300. Additionally, a leash 134 can be secured to the leash strap component 128 and ring 136 for controlling the animal. Specifically, the leash strap component 128 can comprise a leash ring 136 or other suitable mechanism for engaging and retaining the leash 134. The leash 134 is then secured to the leash ring 136, wherein pulling on the leash 134 results in light pressure being exerted by the pet harness device 100 to a chest or ribcage of the animal, forcing the animal to retract (as shown in FIG. 2).

Figure 5:
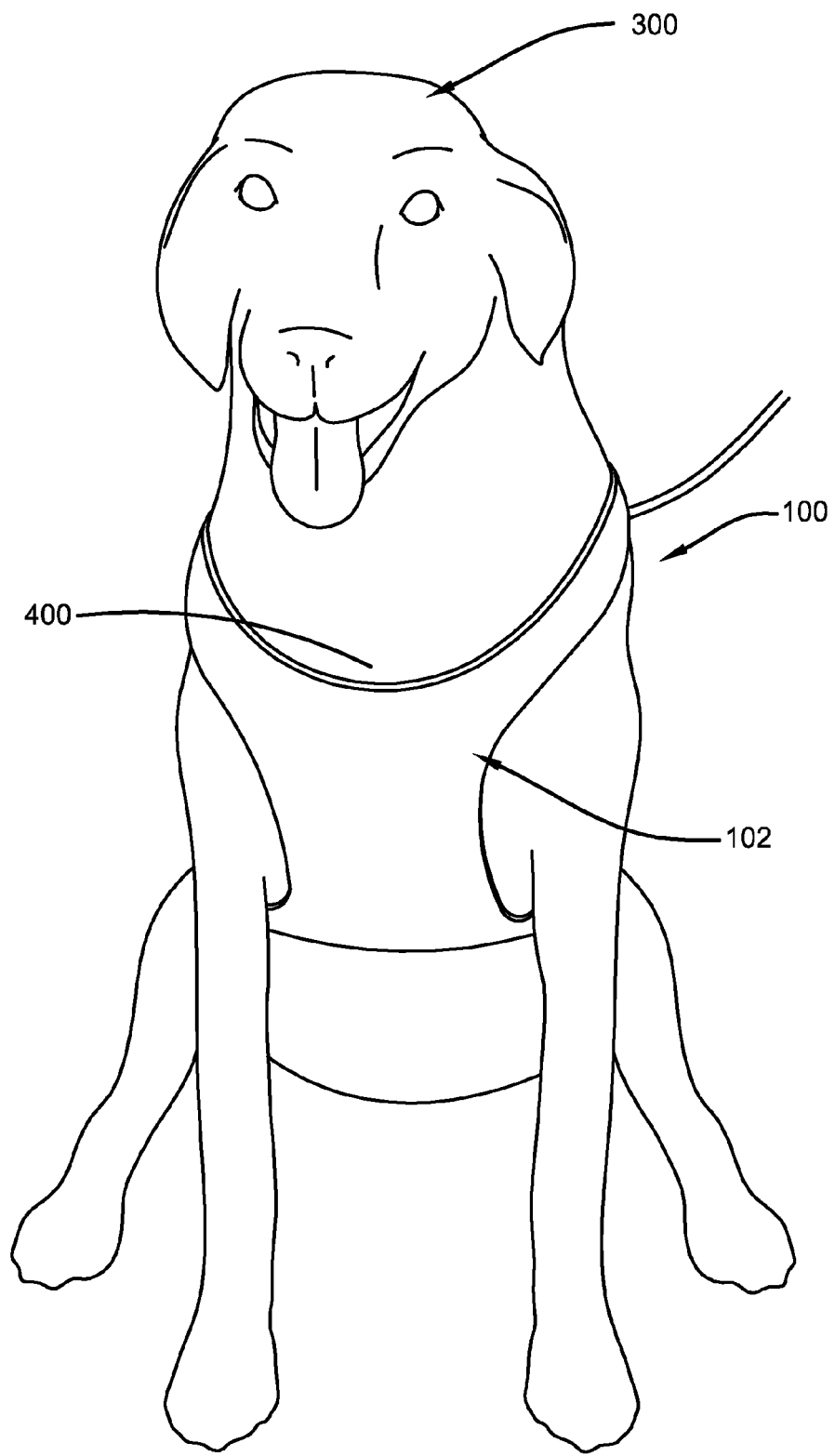
FIG. 5 illustrates a front, perspective view of the pet harness device in use in accordance with the disclosed architecture.

FIG. 5 illustrates the pet harness device 100 in use. As stated supra, the pet harness device 100 comprises an X-shaped component 102 secured around an animal's front legs 400 and chest 402 and then secured on top of an animal's back 404 via a cord component 104. The X-shaped component 102 comprises a second pair of extending portions 112 that secure around an animal's front legs 400 and a first pair of extending portions 110 that secure around an animal's chest 402. The extending portions 110 and 112 are then secured on top of the animal's back 404 via a cord component 104. The cord component 104 comprises at least one adjustable buckle 122 for securing the X-shaped component 102 together on top of the animal's back 404, and at least two rings, ring 124 for securing the second pair of extending portions and ring 126 for securing the first pair of extending portions and a leash strap component 128. A leash 134 can then be secured to the leash strap component 128 and ring 136 for controlling the animal 300.

In operation, a user (not shown) would choose the size and/or specific color of the pet harness device 100 that meets their needs and/or wants, depending on the type, size, and/or shape of the animal that it will be used with. The user would then place the X-shaped component 102 on the animal's chest 400 such that the second pair of extending portions 112 are positioned between the animals front legs then upon both sides of the animal's front legs 400, and the first pair of extending portions 110 are positioned on either side of the animal's chest 402. Once in position, the user would connect the first and second extending portions 110 and 112 via the cord component 104. This will come pre-assembled and all the user would have to do is unbuckle the clip and place the second pair of extending portions over the animals head, slide the right front leg through the right opening, then pass the first pair of extending portions in between the front legs and clip 130 on the left side of the animals chest. Adjustments to fit snugly against the animal are then performed.

Specifically, the user would secure the second pair of extending portions 112 of the X-shaped component 102 through the adjustable buckles 123, to the cord component 104 and through the ring component 124 and then return through the adjustable buckles 123 on each side. Then, the user would thread the leash strap component 128 through the ring 126 of the cord component 104, then through the leash ring 136 and back through ring 126 of the cord component 104, and then would pass through adjustable buckle 133 and through the adjustable buckle 135 and back through adjustable buckle 133. This would secure the leash strap component 128 to the ends 132 of the first pair of extending portions 110 of the X-shaped component 102. Once the first pair and the second pair of extending portions 110, 112 are secured, the adjustable clips 122, 123 and 133 are adjusted and tightened such that the X-shaped component 102 fits snugly against the animal 300.

Once the X-shaped component 102 is secured to the animal 300, the user can secure a leash 134 to the leash ring 136 of the leash strap component 128. The leash 134 functions as a typical leash as is known in the art, except that when the user pulls on the leash 134, light pressure is exerted by the pet harness device 100 to the chest or ribcage of the animal 300, forcing the animal 300 to retract, and pressure is not applied to the animal's neck. Thus, the pet harness device 100 enables the user to control the animal 300 without placing unnecessary pressure or stress on the animal's trachea, neck, and/or leg pits.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pet harness device for use with an animal, comprising:
an X-shaped component comprising a top end, a bottom end, a first pair of extending portions, a second pair of extending portions, a front surface, and a back surface;
a cord component comprising a first end and a second end, and that secures the first pair of extending portions and the second pair of extending portions together on top of an animal's back;
wherein the X-shaped component is secured around an animal's front legs and chest and secured on top of an animal's back via the cord component; and
wherein the cord component comprises a first ring secured on the first end and a second ring secured on the second end; and
wherein the first pair of extending portions are secured together on top of the animal's back via a leash strap component and adjustable buckle; and
wherein the second ring acts as a ring guide and allows the leash strap component and a third ring to pass through the second ring; and
wherein the third ring floats freely around the leash cord component of the first pair of extending portions and attaches to a leash for controlling the animal.

2. The pet harness device of claim 1, wherein the second pair of extending portions are positioned on either side of the animal's front legs.

3. The pet harness device of claim 2, wherein the first pair of extending portions are positioned on either side of the animal's chest.

4. The pet harness device of claim 1, wherein the cord component comprises an adjustable buckle secured to the first end, to allow the X-shaped component to fit snugly against any size animal.

5. The pet harness device of claim 4, further comprising a leash which is secured to the leash strap component via the third ring, wherein pulling on the leash results in pulling on the leash strap component and the first pair of extending portions which causes light pressure to be exerted by the pet harness device to a chest or ribcage of the animal, forcing the animal to retract.

6. The pet harness device of claim 1, wherein the X-shaped component is manufactured of stretchable mesh material.

7. The pet harness device of claim 1, wherein the cord component is manufactured of nylon.

8. A pet harness device for use with an animal, comprising:
an X-shaped mesh component comprising a top end, a bottom end, a first pair of extending portions, a second pair of extending portions, a front surface, and a back surface;
a nylon cord component comprising a first end and a second end, and that secures the first pair of extending portions and the second pair of extending portions together on top of an animal's back;
wherein the first pair of extending portions of the X-shaped mesh component are positioned on either side of the animal's front legs, and the second pair of extending portions of the X-shaped mesh component are positioned on either side of the animal's chest, and both of the first pair and the second pair of extending portions are secured on top of an animal's back via the nylon cord component; and
wherein the nylon cord component comprises a first ring secured on the first end and a second ring secured on the second end; and
wherein the first pair of extending portions are secured together on top of the animal's back via a leash strap component and adjustable buckle; and
wherein the second ring acts as a ring guide and allows the leash strap component and a third ring to pass through the second ring; and
wherein the third ring floats freely around the leash cord component of the first pair of extending portions and attaches to a leash for controlling the animal.

9. The pet harness device of claim 8, wherein the nylon cord component comprises adjustable buckles secured to the first end, to allow the X-shaped mesh component to fit snugly against any size animal.

10. The pet harness device of claim 9, further comprising a leash which is secured to the leash strap component via the third ring, wherein pulling on the leash results in pulling on the leash strap component and the first pair of extending portions which causes light pressure to be exerted by the pet harness device to a chest or ribcage of the animal, forcing the animal to retract.

11. A pet harness device for use with an animal, comprising:
an X-shaped mesh component comprising a top end, a bottom end, a first pair of extending portions, a second pair of extending portions, a front surface, and a back surface;

a nylon cord component comprising a first end and a second end, and that secures the first pair of extending portions and the second pair of extending portions together on top of an animal's back;

wherein the first pair of extending portions of the X-shaped mesh component are positioned on either side of the animal's front legs, and the second pair of extending portions of the X-shaped mesh component are positioned on either side of the animal's chest, and both of the first pair and the second pair of extending portions are secured on top of an animal's back via the nylon cord component; and wherein the nylon cord component comprises an adjustable buckle secured to the first end, to allow the X-shaped mesh component to fit snugly against any size animal; and wherein the nylon cord component comprises a first ring secured on the first end and a second ring secured on the second end; and wherein the first pair of extending portions are secured together on top of the animal's back via a leash strap component and adjustable buckle; and wherein the second ring acts as a ring guide and allows the leash strap component and a third ring to pass through the second ring; and wherein the third ring floats freely around the leash cord component of the first pair of extending portions and attaches to a leash for controlling the animal.

12. The pet harness device of claim 11, further comprising a leash which is secured to the leash strap component via the third ring, wherein pulling on the leash results in pulling on the leash strap component and the first pair of extending portions which causes light pressure to be exerted by the pet harness device to a chest or ribcage of the animal, forcing the animal to retract.

* * * * *